Jan. 13, 1959   R. R. LOBOSCO   2,868,956
MULTI-ARC WELDING
Filed April 4, 1956

INVENTOR.
ROSCOE R. LOBOSCO
BY
Barnwell R. King
ATTORNEY

United States Patent Office 2,868,956
Patented Jan. 13, 1959

2,868,956

MULTI-ARC WELDING

Roscoe R. Lobosco, Fanwood, N. J., assignor to Union Carbide Corporation, a corporation of New York Application April 4, 1956, Serial No. 576,028

14 Claims. (Cl. 219—137)

This invention relates to electric arc welding and more particularly to automatic multi-electrode arc welding.

The invention involves the basic idea of operating a plurality of arcs from a single electrical power source having an "arched" volt-ampere characteristic which ranges between one that is slightly (20%) drooping to one that is rising in the usable welding current range of the arc. The invention offers a number of new and unexpected advantages over the prior art.

A power supply having a rising volt-ampere characteristic offers possibilities, with certain refinements, for substantial simplification of control equipment. In most cases a power source having a rising volt-ampere characteristic makes it possible to strike an arc satisfactorily by running a welding wire electrode directly into the workpiece at full welding speed. In this respect, it is superior in certain cases to a power supply having either a constant potential characteristic, or a conventional power supply having "drooping" characteristic.

Feeding the wire to the work at full welding speed has not been feasible or desirable in many cases in the past for the following reasons: (1) Where large (¼" and larger) diameter wire is used, or where the wire feed rate is high, the insantaneous starting current can reach very high values which can result in undesirable transients in the power supply and in the power line. In some cases, particularly with rectifier-type power supplies, the power line cannot supply the heavy-starting surge which is required. (2) Since both the arc and the power supply take an appreciable time to stabilize, the start is not always smooth. (3) On thin sections of work there is a possibility that the heavy starting current will melt entirely through the work. (4) The arc is not always initiated between the end of the wire and the work. It may start at any point along the wire between the wire and the guide tube. Sometimes the arc is initiated inside the guide tube itself. Any of such conditions can result in a false start, or in freezing the wire to the guide tube.

Another common problem in metal arc welding is the elimination of the crater at the finish of a weld. With a power supply having a substantially constant (slightly drooping) or a rising volt-ampere characteristic, it is possible to eliminate the crater by reducing the wire feed speed which results in a lower arc current. By properly controlling the rate at which the arc current is reduced the crater can be eliminated. This reduction in current can be made gradually or in one or more steps. For welding light-gage materials it is possible to eliminate the crater by permitting the rod (wire) feed motor to coast to a stop, or by supplying suitable braking to bring the wire feeding action to a stop.

Interrupting an arc sometimes presents special problems. For example, if both the arc current and the wire feed are turned off simultaneously, it may be impossible to stop the wire before it contacts the puddle in which it may freeze. If the wire feed is stopped and the arc current maintained until the arc is extinguished a burnback may occur. A power supply having a conventionally "drooping" volt-ampere characteristic is particularly susceptible to burnback. A burnback may occur even when the volt-ampere characteristic is substantially flat as in the case of constant potential power supply.

Another problem is multiple arc initiation in multi-wire electrode welding processes. In most cases it is desirable to have all arcs start simultaneously but in practice this is difficult to achieve. If the traverse is started before all the arcs are established, the arcs that have not been established will be started some time later after a distance along the line of weld has been traversed thus making an incomplete weld. On the other hand, if the traversing is not started until all of the arcs are established, the first arcs established may burn through the work or may deposit undesirably large buttons at the beginning of the weld.

It is frequently found that the weld penetration at the beginning of a weld bead is not as great as it is some distance further along the bead. This effect is due to heat buildup in the plate. This raises a problem where a uniform penetration along the entire length of the weld is necessary, particularly in high-speed welding. The conventional means for overcoming this problem is to start the weld bead on waste material so that the beginning of the bead which lacks penetration can be trimmed off. Attempts to secure complete penetration at the start by delaying the traverse usually results in burntthroughs or in excessive piling up of the weld metal at the start.

Such undesirable effects can be eliminated according to this invention by feeding the wire to the work at some suitable speed, usually lower than the welding speed. When the wire strikes the work to initiate the arc the wire feed rate is changed to the desired welding speed. The results are: (1) The much lower starting transient does not require a power line having exceptionally good regulation at high transient currents. (2) The arc quickly stabilizes and results in a smoother start. (3) There is much less likelihood of melting through thin sections. (4) Arc starting is consistent.

For welding at very low currents, it is sometimes advantageous to start the arc at a somewhat higher current than the desired welding current and then reduce both to the desired welding current. This can be accomplished by starting at a higher wire speed and then automatically reducing the wire feed into the desired welding speed after the arc has been established.

Feeding the wires to the work at a speed suitable for a clean start and then changing the wire feed speed to the desired value for welding is also advantageous for power supplies having a substantially flat volt-ampere characteristic. This method of starting is particularly important for metal arc spot-welding where the arc time is relatively short and, therefore, it is very important that a quick, clean start be made.

Figure 2:
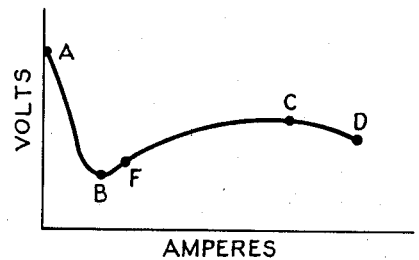
Fig. 2 is an arched V–A characteristic curve of a transformer-type power supply with reactor control and feedback to supply a rising volt-ampere characteristic over at least part of the range.

With some types of power supplies a rising volt-ampere characteristic curve can be obtained in only part of the welding current range. For example, a transformer-type of power supply having a saturable reactor-type of control may have an arched volt-ampere characteristic curve ABFCD, as shown in Fig. 2. The no-load voltage is fairly high as indicated by point A on the curve. As the output current is increased the voltage output will drop to a minimum value at point B. Further increases in output current will produce a rising volt-ampere characteristic to point C after which the volt-ampere characteristic may be fairly flat or drop slightly to point D.

The useful welding current range is between points B and D on the arched part of the curve. From points B to C the V–A characteristic is that of a rising volt-ampere power supply and from C to D the characteristic is that of a constant potential or "drooping" power supply depending on the magnitude of the negative slope. A power supply producing the volt-ampere curve of Fig. 2 will not be burnback proof because the welding current at point B is capable of supporting an arc and because the rising voltage between points B and A will tend to maintain the arc until a burnback occurs. Therefore, it is desirable to interrupt the arc at point F as the arc current is reduced from the normal welding current range if burnback protection is desired. Another possible solution is to load the power supply to point B artificially by means of a resistor or other suitable means. Then the "new" no-load open circuit voltage will be point B rather than A. Thus, since the section between A and B is eliminated, there will be no burnback.

A solution to the problem of interrupting the arcs is to stop the wire feed first, and to interrupt the arc current at a predetermined later time. This method consistently stops the arcs at a desired distance from the work, which distance is determined by the time interval between the stopping of the rod feed and the interruption of the weld current.

An electronically-controlled shunt motor may be used as a wire drive means (rod feed motor). To stop the wire feed the following procedure is used: (*a*) The armature of such motor is de-energized and shorted through a resistor to provide dynamic braking. (*b*) At a predetermined interval later the arc current is interrupted. The motor may or may not have stopped completely at the time the arc current is interrupted. This depends on the amount of braking action and on the time interval between applying the brake and interrupting the arc current. Such combination will provide both crater elimination and anti-stick stopping particularly for light-gage work.

The problem of multi-arc initiation can be overcome if all of the arcs are established at a lower than normal current and when all of the arcs have been initiated automatically establishing the traverse and the normal welding currents to all arcs. This can be done with a power supply having an arched volt-ampere characteristic by first establishing all the arcs at low wire feed speeds and then changing over to normal wire feed speeds when all of the arcs have been established. This procedure avoids incomplete welds, burnthroughs and large buttons at the beginning of the weld.

A way of solving the lack of full penetration at the beginning of a bead is to use an arched volt-ampere power source and to start the arcs at low energy levels and zero or low traverse speed. The arc current and traverse speed are then increased to normal as the heat in the work builds up. This method avoids melt-throughs or metal pile-ups and provides full penetration at the start. The ideal method is to start the arc at reduced wire feed speed and zero or low traverse speed and then gradually increase both the wire feed speed and the traverse speed as the heat in the work builds up until normal wire feed and traverse speeds are reached. In actual practice it has been found that making the transition in two or more steps is sufficient.

Figure 1:
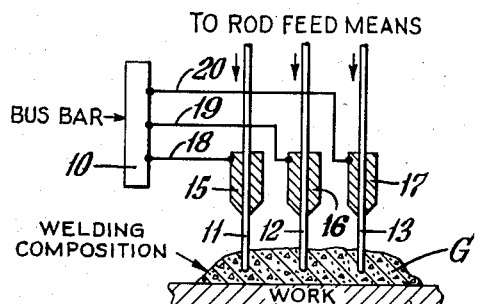
Fig. 1 is an elevational view of a typical multi-electrode submerged-melt welding set-up illustrating the invention.

As shown in Fig. 1, consumable electrode wires or rods 11, 12 and 13 are fed simultaneously through guide tubes 15, 16 and 17 for the purpose of applying welding voltage thereto. The guide tubes are electrically connected by leads 18, 19 and 20 to a bus bar 10 which, in turn, is connected electrically to one side of a welding current power supply. The other side of such power supply is connected to the work W. The guide tubes can be placed in any desired relation to one another as required to obtain the desired result. Under certain conditions it might be desired to combine them in a single unit and under other conditions it might be necessary to space them far apart. In the case of submerged-melt welding, granular welding composition G is supplied to the work-surface around the ends of the electrode-wires. In the case of sigma (shielded inert gas metal arc) welding suitable gas such as argon is supplied to shield the arcs and adjacent metal from the atmosphere.

Figure 3:
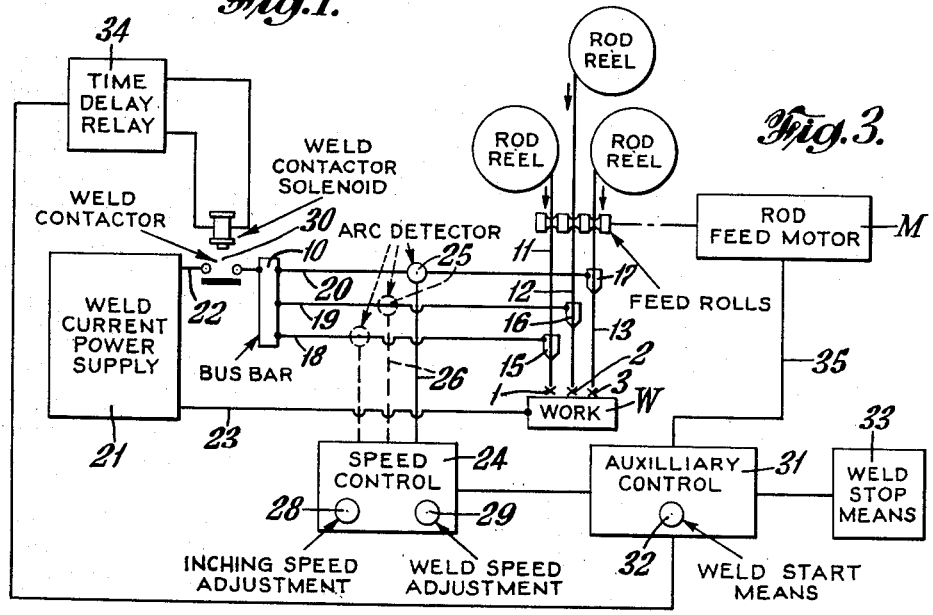
Fig. 3 is a block type circuit diagram of the invention.

Fig. 3 illustrates a typical control set-up utilizing reduced speed inching for starting and anti-stick means for stopping the welding action. The welding current power supply 21 has an arched volt-ampere characteristic, and is connected to the bus bar 10 and work W through leads 22 and 23. The bus 10 is connected to the guide tubes 15, 16 and 17 through leads 18, 19 and 20. An adjustable speed control means 24 controls the speed of the rod feed motor M through conductor 35. Such control is provided with adjustment 28 for the inching speed and another adjustment 29 for the welding wire feed speed and also means for transferring from inching to welding speed. An arc detector 25 in lead 20 is connected to the speed control by means of conductor 26 and provides a signal to transfer the wire feed from inching to welding speed.

A welding current contactor 30 in conductor 22 is used to interrupt the welding current. The arc detector means 25 responds to the establishment of the arc. It can be a current relay or other suitable device. One of its functions is automatically to transfer the adjustable speed control 24 from inching to welding speed. It can also be used to establish the traverse or to start a weld timing device. It can be located in the common ground lead or in one of the electrode leads when the wires are fed from separate leads. An auxiliary control 31 is provided with weld start and stop means 32 and 33 as well as other controls for gas, water, carriage, cold wire addition, etc. A time delay relay 34 energizes the welding rod as soon as the weld start means 32 is operated. When the weld stop means 33 is operated it continues the welding current for a preset time, determined by its setting.

The circuit, Fig. 3, operates in the following manner when the weld start means 32 is operated: The welding wires 11, 12 and 13 are energized. The rod feed motor M feeds the wires toward the work W at inching speed. The wires strike the work and initiate an arc. The arc detector 25 determines that the arc is established and changes the wire feed speed from inching to welding speed and the arcs continued as long as desired. When the weld stop means 33 is operated: The wire feed motor M is de-energized and stopped by suitable means such as dynamic braking. The time delay means 34 continues to maintain the arcs for a suitable preselected time after the motor M is deenergized.

The weld stop means 33 can be any suitable device. For example, switches and push buttons can be used for manual operations and weld timers or limit switches can be used for automatic operations. Devices such as water and gas controls, gas post flow controls, carriage and cold wire addition controls which are normally part of many welding installations may be included but are not shown in Fig. 3.

While three arcs 1, 2 and 3 are shown, the same principles apply when two or more arcs are used. The weld starting means 31 energizes, i. e., applies welding voltage to all of the weld wires 11, 12, 13 and feeds all of the wires down at preselected inching speeds as determined by the settings of the speed control 24. Each of the wires strikes the work and initiates its respective arc. The inch speed control is set so that arc 3 is struck last. Thus arcs 1 and 2 strike first followed by arc 3. When arc 3 is struck, it operates the arc detection means 25 which, in turn, transfers all wires from inching to welding speeds.

A modification of the invention which does not require that the inching speed of wire 13 be set lower than wires 11 and 12 is as follows: Provide arc detecting means in leads 18, 19 and 20 and connect such means so that the transfer from inching to welding speed is delayed until all arcs have been initiated. This same arrangement can be used to delay the start of the traverse until after all arcs have been initiated.

Various modifications are within the scope of this invention. For example, the anti-stick means described herein could be included with multiple arc starting, traverse controls, cold wire controls, and gas post flow.

Advantages of the invention are as follows.

*Economy.*—The fact that two or more arcs can be supplied by a single generator is obviously cheaper than operating a power source for each arc.

The arcs can be used as two or more separate and distinct simultaneous arcs whether a single workpiece or two or more workpieces are used.

The arc can be used with two or more simultaneous arcs feeding into the same puddle since the use of a single arched power source permits the arcs to be brought closer together than in the case with conventional power supplies.

Where two or more gas-shielded arcs are fed from a constant potential or rising volt-ampere power supply, the two or more arcs can be within the same gas cup.

Figures 4, 5:
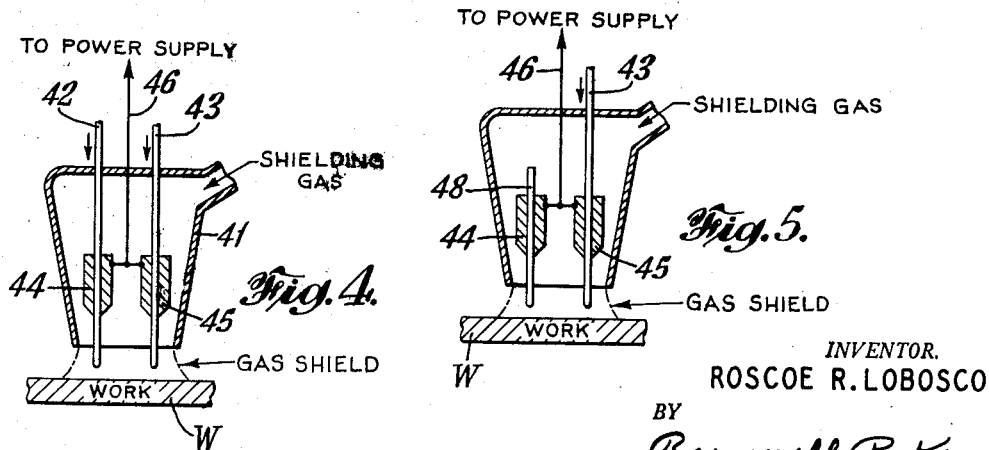
Fig. 4 is a fragmentary vertical section of an inert gas shielded multi-consumable electrode welding set-up in a single gas cup.
Fig. 5 is a similar view of a non-consumable and a consumable electrode combination in a single gas cup.

A non-consumable electrode gas-shielded arc can be fed from a flat or rising volt-ampere power supply and the arc current can be controlled by raising or lowering the electrode. A non-consumable electrode and a consumable electrode can be fed from the same constant-potential or rising volt-ampere power source. The non-consumable electrode can supply the sealer bead while the consumable electrode would supply the filler metal over the sealer bead. The consumable electrode could be either of the gas-shielded type or of the submerged-arc type. Where both the non-consumable electrode and the consumable electrode are of the gas-shielded type, a common gas cup can be used. Fig. 4 is an example of two wires 42 and 43 being fed through and from a single gas cup 41 which provides the shielding gas. Wire 46 connects the guide tubes 44 and 45 to the power supply. Fig. 5 shows a similar arrangement wherein a non-consumable electrode 48 is in the same gas cup as the consumable electrode 43. Electrode 44 can be made of tungsten or other suitable material.

With the multi-arc as described therein, the two or more arcs need not be fed into the same puddle. They can be two or more separate arcs on the same workpiece following the same bead or they can lay down separate beads on the same workpiece or different workpieces. They need not necessarily be fed through a common nozzle or even the same rod feed means.

The two or more arcs of the multi-arc system can be operated at the same welding currents or at different welding currents to suit the requirements of the welding job. For example: (*a*) If all of the rods are of the same size and composition, and the drive rolls are of the same diameter, the welding current in all three arcs will be substantially the same. (*b*) If two or more rods are fed at the same rate of speed, but the two rods differ in diameter, then the arc current for each of the arcs will be different, since the current in each arc will adjust itself to burn off that particular size of rod at the speed at which it is being fed. (*c*) By using different diameters of drive rolls driven by a common motor, the feed rate of any rod can be adjusted relative to any other rod. (*d*) The two or more rods can be fed from two or more rod feed means and thus obtain completely independent current control for each of the rods.

The various current control means described above provide great flexibility in welding. For example: (*a*) A sealer bead can be operated at low current while a following filler arc can be operated at a suitable higher current. (*b*) In cladding or buildup work, it might be desirable to lay a heavy bead in the center while simultaneously laying a lighter bead along the edges. (*c*) Where prepared edges are used, it might be desirable to lay a heavy bead down to the center with a lighter bead toward the edges of the prepared work to accommodate the U- or V-groove edge preparation. (*d*) A constant-potential or rising volt-ampere multi-arc system can also be used to deposit metal from two or more rods of different composition. This could be used to: (1) Provide an alloy bead which can be controlled by varying the feed rates of the two or more constituent rods. (2) Provide a filler or buildup bead followed by an overlay of a different material.

An A. C. constant-potential or rising volt-ampere multi-arc system is within the scope of the invention as described herein. Similarly, a two or three-phase constant potential or rising volt-ampere system wherein two or more arcs supplied from the system are also within the scope of the invention.

While the invention has been described above as especially suitable for gas-shielded and submerged arc welding, it is also suitable for obvious variations and combinations thereof as will be apparent to those skilled in the art.

What is claimed is:

1. Electric multi-arc welding which comprises establishing parallel arcs between a workpiece and a plurality of electrodes; and energizing such arcs from a common power source connected to all of said electrodes and to such workpiece, respectively; such common power source having an arched volt-ampere characteristic in the usable welding current range of such arcs, in which such electrodes are fed toward such workpiece at different speeds.

2. In electric multi-arc welding, wherein a plurality of consumable continuous metal electrodes are fed toward the work to establish and maintain parallel arcs and the welding circuit includes a common power source, said electrodes and said work; the method which comprises employing a common power source having an arched volt-ampere characteristic in the usable welding current range and surge current characteristics such as to permit instantaneous arc ignition and maintenance upon contact of any one of such electrodes with the work; feeding said electrodes toward said work at a preselected inching feed rate to initiate said arcs; automatically feeding said electrodes at a normal welding feed rate upon establishment of all of said arcs; maintaining said arcs and said normal welding feed rate of said electrodes to complete the welding of said work; and, at the completion of such welding of said work, decelerating said electrode feed rate while continuing the energization of said welding circuit until such circuit is broken by the extinguishment of all of such arcs.

3. Process of arc welding which comprises applying the output of a single source of welding power having an arched volt-ampere characteristic between a plurality of wire electrodes and a work electrode, feeding the wires toward the work at a speed selected for good arc starting, striking welding arcs between said electrodes, then feeding the wires toward the work at another predetermined speed suitable for producing a desired weld bead, and finally stopping the welding action by reducing the wire feed speed in a predetermined manner until the arcs are extinguished.

4. Process of starting an arc weld bead with an electric arc supplied from a source of current having an arched volt-ampere characteristic, comprising establishing the arc current and the traverse speed at below normal values, and then changing these to normal values after such arc is established.

5. Process of starting an arc weld bead with an arc supplied from a source of current having an arched volt-ampere characteristic, comprising establishing such arc at reduced current and traverse speed, and then bringing both the arc current and the traverse speed to normal values at the same time after such arc is established.

6. Method of welding work with a plurality of arcs formed with the aid of a plurality of electrodes at least one of which is a consumable electrode, and a source of welding power having a volt-ampere characteristic selected from the class consisting of characteristics that are substantially flat, rising and arched, in the usable welding range, and wherein such consumable electrode is first fed toward the work at a starting speed and, upon initiating the arc, at a different speed suitable for welding, characterized in that the change in feeding speed of the consumable electrode is delayed until the last arc is initiated.

7. Method as claimed in claim 6, in which a plurality of consumable electrodes are fed toward the work at the same starting speed, characterized in that the change in feeding speed is effected in response to the flow of arc current through all such electrodes simultaneously.

8. Method as claimed in claim 6, in which a plurality of consumable electrodes are fed toward the work at different starting speeds, characterized in that the change in feeding speed is effected in response to the flow of arc current through the electrode which advances toward the arc at the slowest starting speed.

9. Method as claimed in claim 6, in which relative motion is effected between the electrodes and the workpiece along a welding path, characterized in that said relative motion is initiated or increased in speed simultaneously with the change in feeding speed of the consumable electrode or electrodes.

10. Method as claimed in claim 6, in which a common power source is employed having a volt-ampere characteristic exhibiting an initial droop followed by a rise in the welding range, and which includes terminating the welding action by first interrupting the electrode feed and thereafter interrupting the current flow, characterized in that the current flow is interrupted before the welding current delivered to the several arcs has reached a value such that a further reduction in current causes a rise in voltage.

11. Apparatus for carrying out the method of claim 10, which includes feeding means for a plurality of consumable electrodes, a common source of welding power and control means for changing the speed of said feeding means from a preselected starting speed to the speed required for welding in response to detection means, characterized in that said arc detection means are arranged to operate said control means when arc current is flowing in the welding circuit of at least the slowest fed electrode.

12. Apparatus as claimed in claim 11, which includes feeding means adapted to feed a plurality of consumable electrodes toward the work at the same speed, characterized in that an arc detector is provided in the welding circuit of each electrode, and that the control means is rendered operative when all arc detection means are energized simultaneously.

13. Apparatus as claimed in claim 11, which includes feeding means adapted to feed one of a plurality of consumable electrodes at a slower speed than the remainder, characterized in that an arc detector is provided in the welding circuit of only the slowest moving electrode and that the control means is rendered operative when said arc detection means is energized.

14. Apparatus as claimed in claim 13, characterized in that said feeding means comprise drive rolls of different diameters driven by a common motor.

References Cited in the file of this patent

UNITED STATES PATENTS

| | | |
|---|---|---|
| 1,701,372 | Jefts | Feb. 5, 1929 |
| 2,152,785 | Blankenbuehler | Apr. 4, 1939 |
| 2,460,990 | Kratz et al. | Feb. 8, 1949 |
| 2,654,015 | Landis et al. | Sept. 29, 1943 |
| 2,655,586 | Schreiner et al. | Oct. 13, 1953 |
| 2,658,162 | Tichenor et al. | Nov. 3, 1953 |
| 2,756,311 | Persson et al. | July 24, 1956 |

FOREIGN PATENTS

| | | |
|---|---|---|
| 691,373 | Great Britain | May 13, 1953 |